J. H. OSGOOD.

COVERING ROUNDED ARTICLES WITH LEATHER.

No. 7,046. Reissued April 11, 1876.

WITNESSES

E. S. Ottingham.

F. O. McCleary.

INVENTOR

James H. Osgood,

By Leggett & Leggett.

Attorneys

UNITED STATES PATENT OFFICE.

JAMES H. OSGOOD, OF BOSTON, MASS., ASSIGNOR TO LOUIS H. MAHN.

IMPROVEMENT IN COVERING ROUNDED ARTICLES WITH LEATHER.

Specification forming part of Letters Patent No. 127,098, dated May 21, 1872; reissue No. 7,046, dated April 11, 1876; application filed March 17, 1876.

*To all whom it may concern :*

Be it known that I, JAMES H. OSGOOD, of Boston, in the county of Suffolk and State of Massachusetts, have invented a new and useful Improvement in Covering Base-Balls and other similar articles; and I do hereby declare the following to be a full, clear, and exact description of the invention, such as will enable others skilled in the art to which it pertains to make and use it, reference being had to the accompanying drawings which form a part of this specification.

The nature of my invention consists, first, in the cover of a base-ball formed of two pieces of leather suitably secured to each other; second, the seams of a base-ball united by the double herring-bone knotted lock-stitch; third, a base-ball covering consisting of an outer and an inner covering applied to the ball independently of each other; fourth, a base-ball covering consisting of independent outer and inner coverings made of hemispherical sections, the seams of the inner and outer covers arranged relatively to each other to break joints.

Figure 1:
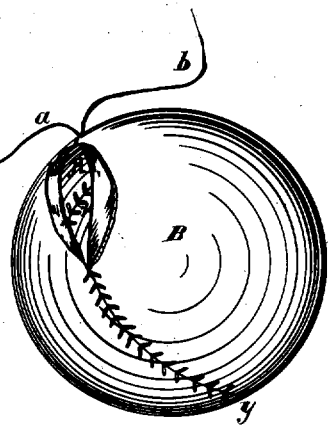
Figure 2:
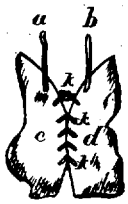

In the accompanying drawing, the invention is illustrated by a game-ball. This ball is made in the usual way, with a rubber or cork core, and yarn tightly wound on till the ball is of proper size. Stout leather is then cut to proper shape to form one hemisphere of the cover, and is thoroughly wet, and, while wet, put into a hemispherical mold, preferably of wood, and strongly compressed therein by a hemispherical plunger, closely fitting the mold. It is then allowed to remain in the mold till somewhat dry, the compression itself removing considerable water by pressure. The edges of the hemisphere are then trimmed, and the leather laid by so as to become thoroughly hard and dry. When it is dry and it is desirable to cover a ball, two of these hemispheres of leather are taken, moistened enough to make them flexible, while still retaining their shape, and being softened at the edges sufficient to admit of working a needle through them. This drying to shape and subsequent softening is requisite because, when first molded, the leather dries unevenly; and in fitting on the covers it is requisite to have only the edges soft for sewing, while the dishing-part should be only flexible. Two of these hemispheres are then placed upon the yarn-ball, and are drawn into place by sewing them as follows: A thread of suitable length is taken, having a needle at each end. The needles are passed from below up through the leather, the thread drawn tight on both sides, crossed, and tied in a "square or reefing knot," by which means the two threads are looped around each other. The needles are then passed under the leather, up through it, the threads again drawn up, again knotted, and this repeated until the leather is all sewed on. The usual stitch for these purposes is made with a single thread carried up through the leather, across the seam and under the leather on the other side, up through it, across under, up through, across, and so on, making the "herring-bone" stitch. This, it will be seen, is a sort of "double herring-bone" knotted, only the thread, which starts on a given side by the knotting, never crosses to the other side. Almost any knot used for fastening the ends of rope together will serve for the knot in this case, but the "square knot" or the "Carrick Bend or weaver's knot" would be the one most generally adopted, and probably the best. This form of stitch is illustrated at Fig. 2, where *a* and *b* are the two threads, *c* and *d* the two leather sides, and *k* the knots. This stitch will not rip, for each stitch is independently fastened. The ball is now fit to be used, but is not suitable for the very hardest usage. I call this cover so put on the first cover, or "binder." I now take two other hemispheres of leather, place them upon the ball so covered with the first cover, after that has dried, in such a way as to have their seam break joints with the seam of the covers already on, and sew them, as before, with the "double herring-bone stitch knotted." This construction is shown at Fig. 1, where A is the binder, *x* its seam, and B is the outer cover, and *y* its seam. By this construction I save sewing, because the seam is the line of a great circle, and not, as is usual, a meandering line sufficiently long to make two great circles. I thus put my two envelopes on the ball, with only the amount of sewing now used for one. I also secure a perfectly spherical form by molding the leather first. I also have leather to resist the strain in every direction. The seams cannot rip.

The illustration given is that of a base-ball, but the stitch is equally applicable to the sewing of rawhide covers, to pack or military saddles, or to any strained covering of leather. The method of molding or shaping the leather and then drying it before attempting to fit it, moistening it while fitting only slightly, is also applicable to all leather-coverings, as of harness, buckles and trimmings, panniers, ax and shovel slings, and the like.

Having fully described my invention, what I claim, and desire to secure by Letters Patent, is—

1. A base-ball cover formed of two pieces of leather, secured to each other by a single seam, substantially as and for the purpose specified.

2. A base-ball cover having its seam united by the double herring-bone knotted lock-stitch, substantially as and for the purpose specified.

3. The covering of a base-ball consisting of an outer and an inner covering, each of which is composed of two pieces of leather, and applied to the ball independently of each other, substantially as and for the purpose specified.

4. A base-ball covering composed of independent inner and outer coverings, made up of hemispherical sections, the seams of the inner and outer covers arranged relatively to each other, to break joints, substantially as and for the purpose specified.

JAMES H. OSGOOD.

Witnesses:
GEO. E. LOVETT,
W. N. REED.